United States Patent
Abou Mahmoud et al.

(10) Patent No.: US 9,916,127 B1
(45) Date of Patent: Mar. 13, 2018

(54) AUDIO INPUT REPLAY ENHANCEMENT WITH CLOSED CAPTIONING DISPLAY

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/265,558

(22) Filed: Sep. 14, 2016

(51) Int. Cl.
- G06F 3/16 (2006.01)
- G06F 17/28 (2006.01)
- G10L 15/18 (2013.01)

(52) U.S. Cl.
CPC .......... *G06F 3/165* (2013.01); *G06F 17/289* (2013.01); *G10L 15/1822* (2013.01)

(58) Field of Classification Search
CPC .... G06F 17/28; G06F 17/2809; G06F 17/289; H04N 5/445; H04N 2005/44539; H04N 5/783; H04N 2005/44526; G10L 15/1822; G11B 27/005
USPC .......... 704/2, 3, 4, 5, 8, 235, 270; 707/732; 725/47, 53, 137, 468
See application file for complete search history.

(56) References Cited

U.S. PATENT DOCUMENTS

| | | | |
|---|---|---|---|
| 5,848,130 A | 12/1998 | Rochkind | |
| 6,442,243 B1 | 8/2002 | Valco et al. | |
| 7,092,496 B1 | 8/2006 | Maes et al. | |
| 7,729,478 B1 | 6/2010 | Coughlan et al. | |
| 8,233,597 B2 | 7/2012 | Kerr et al. | |
| 8,706,741 B2 * | 4/2014 | Murakoshi | G11B 27/10 707/749 |
| 8,781,082 B1 | 7/2014 | Wilson | |
| 9,244,913 B2 * | 1/2016 | Padi | G06F 17/289 |
| 9,477,657 B2 * | 10/2016 | Zhang | G06F 17/289 |
| 2003/0046075 A1 * | 3/2003 | Stone | G06F 17/2809 704/257 |
| 2008/0155585 A1 * | 6/2008 | Craner | G11B 27/005 725/32 |
| 2008/0279529 A1 | 11/2008 | Asamura et al. | |
| 2010/0077435 A1 | 3/2010 | Kandekar et al. | |

(Continued)

OTHER PUBLICATIONS

Mell et al., "Effectively and Securely Using the Cloud Computing Paradigm" dated Oct. 7, 2009, NIST, Information Technology Laboratory, Total 80 pages.

(Continued)

*Primary Examiner* — Martin Lerner
(74) *Attorney, Agent, or Firm* — Janaki K. Davda; Konrad, Raynes, Davda and Victor LLP

(57) ABSTRACT

Provided are techniques for audio input replay enhancement. It is determined that an audio input has been replayed a pre-determined number of times. In response to the determination, a key segment in the audio input is identified and a preferred language of a user listening to the audio input is identified. In response to determining that a language of the audio input is not the preferred language of the user, the key segment is translated into the preferred language of the user. While replaying the audio input, playing of the key segment is automatically slowed down and closed captioning is displayed for the key segment in the preferred language of the user.

18 Claims, 6 Drawing Sheets

(56) References Cited

U.S. PATENT DOCUMENTS

| | | | |
|---|---|---|---|
| 2010/0106482 A1* | 4/2010 | Hardacker | G06F 17/289 |
| | | | 704/3 |
| 2010/0265397 A1* | 10/2010 | Dasher | G06F 17/289 |
| | | | 725/87 |
| 2012/0066059 A1* | 3/2012 | Berger | G06Q 30/0277 |
| | | | 705/14.49 |
| 2013/0054222 A1* | 2/2013 | Sharma | G06K 9/00442 |
| | | | 704/2 |
| 2013/0066623 A1* | 3/2013 | Chou | G06F 17/289 |
| | | | 704/2 |
| 2013/0188933 A1 | 7/2013 | Li et al. | |
| 2014/0372102 A1 | 12/2014 | Hagege et al. | |
| 2015/0154183 A1* | 6/2015 | Kristjansson | G06F 17/289 |
| | | | 704/3 |
| 2015/0356077 A1* | 12/2015 | Kristjansson | G06F 17/289 |
| | | | 704/2 |
| 2017/0064244 A1* | 3/2017 | Abou Mahmoud | G11B 27/005 |

OTHER PUBLICATIONS

Mell et al., "The NIST Definition of Cloud Computing" dated Sep. 2011, Computer Society, Recommendations of the National Institute of Standards and Technology, Total 7 pages.

* cited by examiner

AUDIO INPUT REPLAY ENHANCEMENT WITH CLOSED CAPTIONING DISPLAY

FIELD

Embodiments of the invention relate to audio input replay enhancement, and, in particular, for an interactive Question and Answer (Q&A) system.

BACKGROUND

An interactive Question and Answer (Q&A) system receives a questions, searches a data store for one or more answers, and provides the answers. The Q&A system is interactive in that the Q&A system may also ask questions of the user to narrow or filter the search for an answer. The data store typically stores sound files or text files that may be read out loud.

When a user interacts with a Q&A system and tries to listen and fully understand questions that the Q&A system generates from a machine generated text, the user may be challenged by the fast spoken text provided by the Q&A system. The user has to either ask for more clarifications or somehow replay the question manually.

In other cases, the user tries to hear a voicemail or watch a video clip on-line, and the user has to hit the replay button several times if a certain message was spoken too fast or was not spoken clearly. This is rather time consuming.

Things may get worse when it comes down to the user depending on assistive technology, such as a screen reader, to work or in daily life. It is not efficient if the user has to manually have the screen reader read the same long paragraph again and again.

SUMMARY

Provided is a method for audio input replay enhancement. The method comprises: determining, using a processor of a computer, that an audio input has been replayed a pre-determined number of times; in response to the determination, identifying a key segment in the audio input and identifying a preferred language of a user listening to the audio input; in response to determining that a language of the audio input is not the preferred language of the user, translating the key segment into the preferred language of the user; and, while replaying the audio input, automatically slowing down playing of the key segment and displaying closed captioning for the key segment in the preferred language of the user.

Provided is a computer program product for audio input replay enhancement. The computer program product comprises a computer readable storage medium having program code embodied therewith, the program code executable by at least one processor to perform: determining that an audio input has been replayed a pre-determined number of times; in response to the determination, identifying a key segment in the audio input and identifying a preferred language of a user listening to the audio input; in response to determining that a language of the audio input is not the preferred language of the user, translating the key segment into the preferred language of the user; and, while replaying the audio input, automatically slowing down playing of the key segment and displaying closed captioning for the key segment in the preferred language of the user.

Provided is a computer system for audio input replay enhancement. The computer program product comprises a computer readable storage medium having program code embodied therewith, the program code executable by at least one processor to perform operations comprising: determining that an audio input has been replayed a pre-determined number of times; in response to the determination, identifying a key segment in the audio input and identifying a preferred language of a user listening to the audio input; in response to determining that a language of the audio input is not the preferred language of the user, translating the key segment into the preferred language of the user; and, while replaying the audio input, automatically slowing down playing of the key segment and displaying closed captioning for the key segment in the preferred language of the user.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments automatically slow down on key segments (portions) of an audio input, such as a voicemail message, audio of a video clip, audio of a screen reader, or any other similar media with sound.

Figure 1:
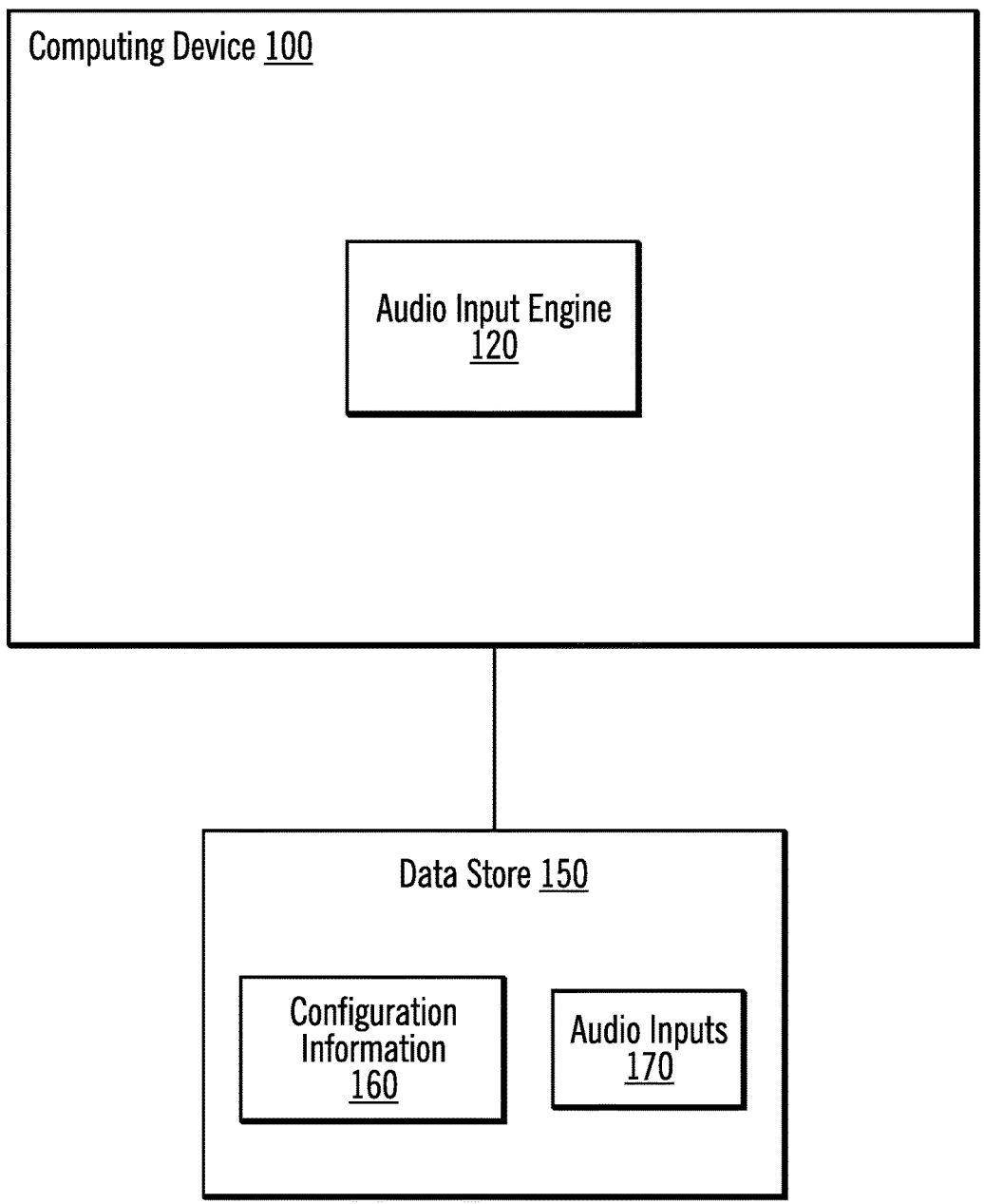
FIG. 1 illustrates, in a block diagram, a computing environment in accordance with certain embodiments.

FIG. 1 illustrates, in a block diagram, a computing environment in accordance with certain embodiments. A computing device 100 includes an audio input engine 120. The computing device is coupled to a data store 150, which stores configuration information 160 and audio inputs 170. Each of the audio inputs 170 may be a voicemail message, audio from a video clip, audio from a screen reader, an answer played in a Question and Answer (Q&A) system, or any other similar input with sound. The term "audio input" is used to indicate that audio is received or obtained by the audio input engine 120 for enhancement.

In certain embodiments, the audio input engine 120 is incorporated into or works with a Q&A system. In other embodiments, the audio input engine 120 is incorporated into or works with a voicemail system, a video application, or assistive technology, such as a screen reader.

Some usage scenarios are presented herein merely to enhance understanding of embodiments of the invention, but embodiments are not intended to be limited to these usage scenarios.

In a first usage scenario, a user is not feeling well. The user uses an interactive Q&A system to search for health related information. The interactive Q&A system asks the user some questions to provide better health related information. The questions are asked via sound (rather than text) by the Q&A system, and the answers are provided via audio (sound) by the Q&A system. If the user did not hear the question that the Q&A system asked, the user has to replay the question. The audio input engine 120 identifies key segments (information) within the audio input (of a question asked by the Q&A system. With embodiments, the key segments within the audio input are determined by searching for information associated with pre-defined key words (stored in configuration information), such as name, phone number, address, zip code, etc. For example, the audio input engine 120 identifies key segments in the question of: temperature, stress, and appetite. The audio input engine 120 replays the question by slowing down on the key segments in the question in response to the user requesting to replay the question. The audio input engine 120 automatically turns on the closed captioning for the user for those key segments when the user replays the message. With embodiments, the audio input engine 120 also detects the preferred language the user uses on the computing device and/or the operating system's primary language (which may be used if the user's preferred language is not available) and displays the automatically translated closed captioning in that language for the user's convenience.

In a second usage scenario, a user needs to listen to a certain segment of a voicemail message (e.g., from phone's voice mail). The audio input engine 120 analyzes and identifies the segment that the user has to replay again one or more times. The audio input engine 120 stores a starting timestamp and an ending timestamp of that segment of the message. The audio input engine 120 slows down for the user when the user first replays this part of the message. The audio input engine 120 is able to slow down even more when the user has to subsequently replay this segment of the message again.

In a third usage scenario, a user needs to listen to a voicemail message (e.g., from phone's voice mail). The audio input engine 120 analyzes the voicemail message the user received to identify key segments within the voicemail message. For example, the audio input engine 120 may identify a name and a phone number of the person who left the message as key segments. The audio input engine 120 slows down on the key segments in the voicemail message when the user has to replay the voicemail message.

With embodiments, the user may configure what type of audio information may be defined as key segments within an audio input (e.g., name, phone number, and address). Embodiments may be implemented in video playing application and in screen reader software.

Embodiments display the closed captioning for the key segments when playing that part of the message slowly for the user. The audio input engine 120 displays translated closed captioning for the user for the key segments when playing that part of the message slowly for the user by using the language the user feels more comfortable with, and this may include translating the key segments from the language of the audio input into the user's preferred language.

Figure 2:
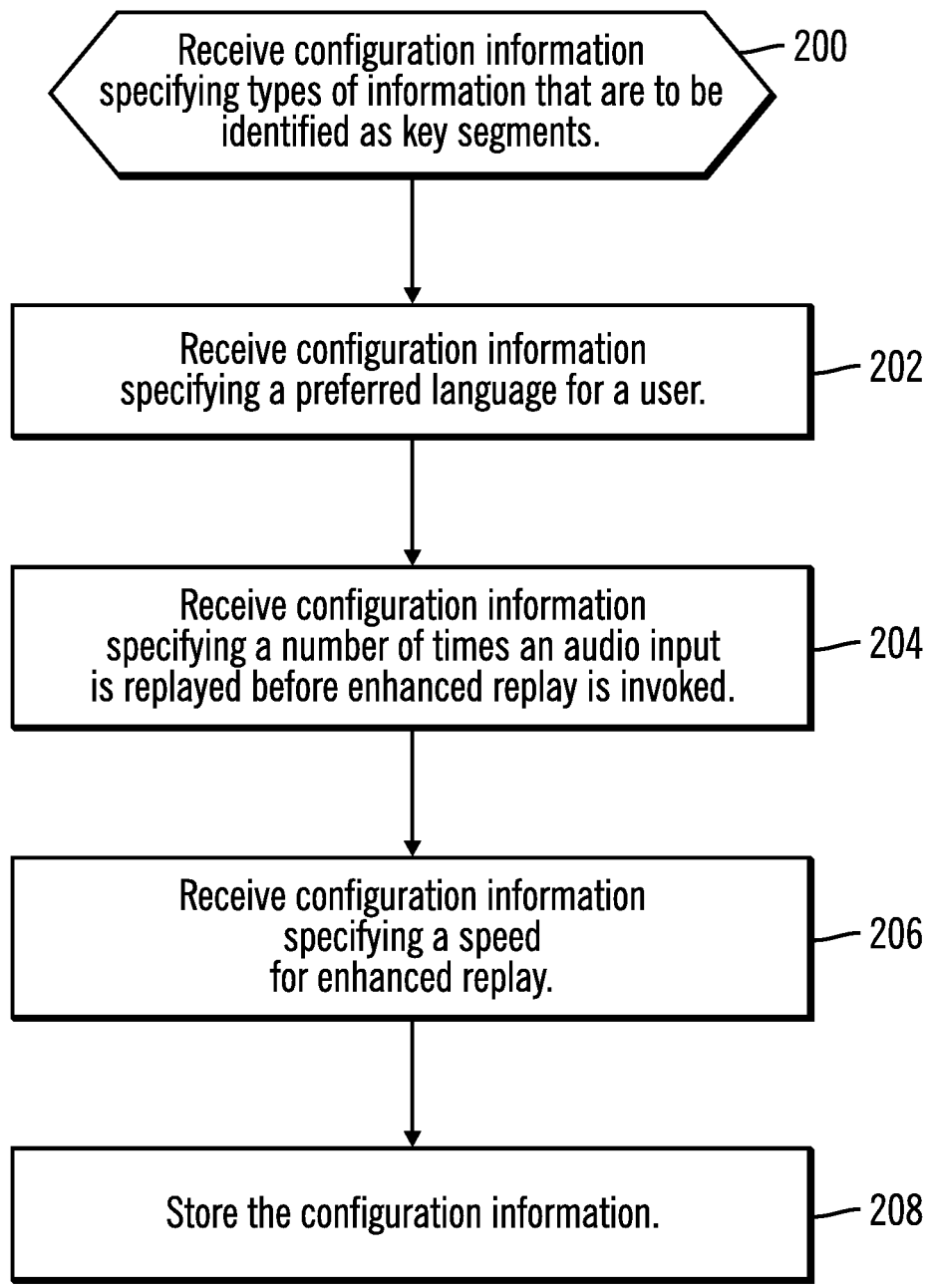
FIG. 2 illustrates, in a flow chart, operations for creating configuration information in accordance with certain embodiments.

FIG. 2 illustrates, in a flow chart, operations for creating configuration information in accordance with certain embodiments. Control begins at block 200 with the audio input engine 120 receiving configuration information specifying types of information that are to be identified as key segments (in any audio input being analyzed with the processing of FIG. 3). For example, types of information may include: name, phone number, address, zip code, etc. In block 202, the message engine receives configuration information specifying a preferred language for a user. For example, the language may be English, French, Chinese, etc. In block 204, the message engine receives configuration information specifying a number of times an audio input is replayed before enhanced replay is invoked (i.e., before the audio input engine 120 is invoked). With embodiments, there may be a different number of times for different types of audio input (e.g., 3 times for a voicemail message and 2 times for an answer to a question). In block 206, the audio input engine 120 receives configuration information specifying a speed for speaking for enhanced replay. The speed indicates, how slow to speak the one or more key segments and/or the audio input containing the one or more key segments. With embodiments, the speed at which to speak various types of key segments may be different (e.g., one speed for a phone number type of key segment and another speed for a name type of key segment). With embodiments, the speed at which to speak various types of audio input may be different (e.g., one speed for key segments in answers to questions and another speed for key segments in a voicemail message).

In block 208, the audio input engine 120 stores the configuration information. With embodiments, the configuration information may be stored per user or per a group of users.

Figure 3:
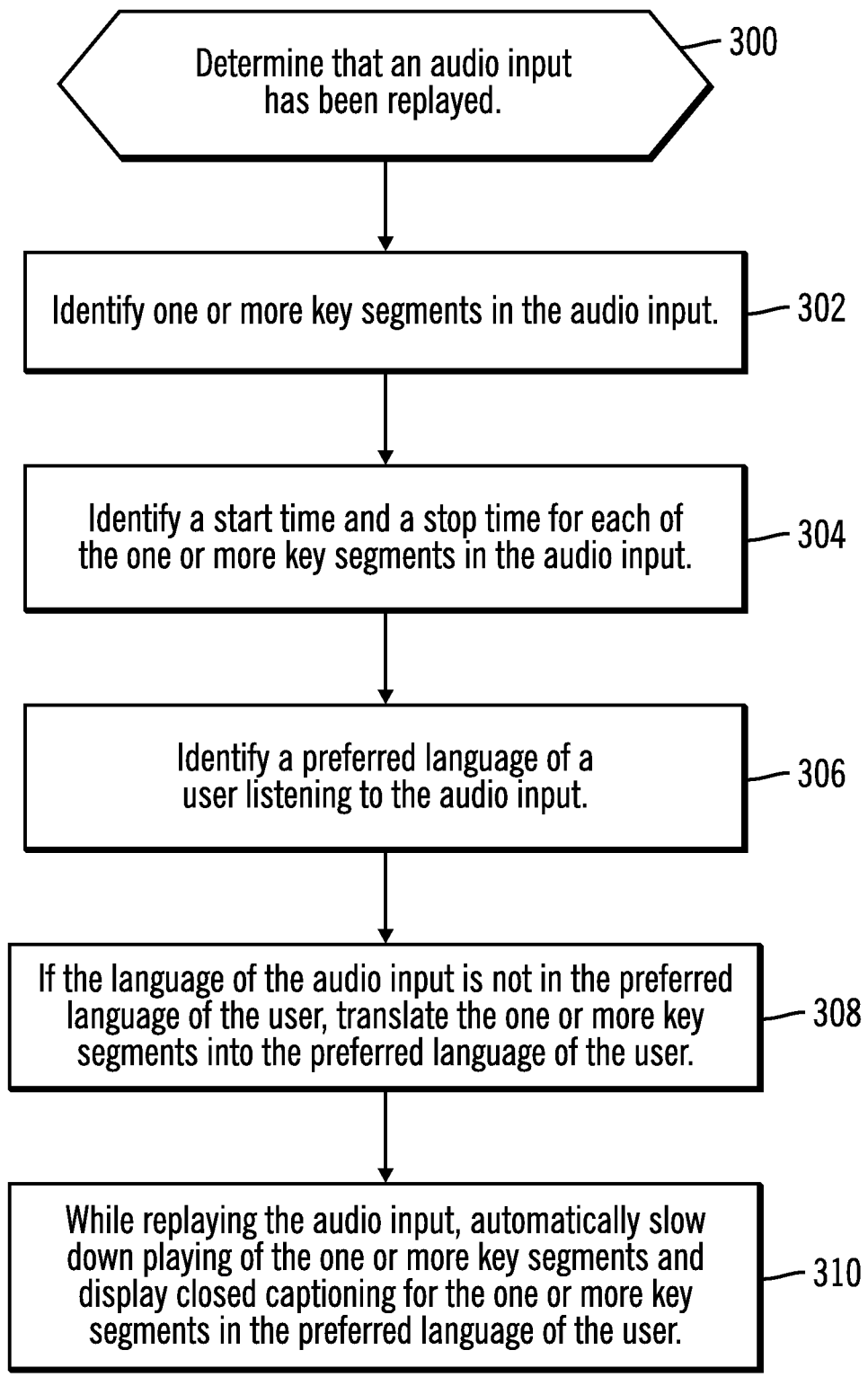
FIG. 3 illustrates, in a flow chart, operations for replaying an audio input in accordance with certain embodiments.

FIG. 3 illustrates, in a flow chart, operations for replaying a message in accordance with certain embodiments. Control begins at block 300 with the audio input engine 120 determining that an audio input has been replayed. With embodiments, the audio input engine 120 may automatically obtain the audio input in response to a user replaying a message the number of times specified in the configuration information.

In block 302, identifies one or more key segments in the audio input. In certain embodiments, the one or more key segments are identified based on the configuration information indicting what types of information are to be key segments. Also, the one or more key segments may be identified based on segments of the audio input that were manually replayed by the user. Moreover, when using a Q&A system, when the Q&A system is playing audio input of a response to a user's question (where the response may be an answer to the question or a new question asked by the Q&A system), the audio input engine 120 identifies the one or more key segments based on the question that the user asked. For example, a sample question may be: "what is the difference between regression and classification?" The sample answer to the sample question may be: "Regression is used to predict continuous values. Classification is used to predict which class a data point is part of (discrete value)". With this example, the key segment "predict continuous values" may be repeated for the user's convenience.

In block 304, the audio input engine 120 identifies a start time and a stop time for each of the one or more key segments in the audio input.

In block 306, the audio input engine 120 identifies a preferred language of a user listening to the audio input. The language may be, for example, English, French, Chinese, etc. With embodiments, if the preferred language is not available on the computing device (e.g., the user wants Hindi, but it is not available) or the preferred language is not specified, the audio input engine 120 identifies the operating system's primary language as the preferred language of the user.

In block 308, if the audio input engine 120 determines that the language of the audio input is not in the preferred language of the user, the audio input engine 120 translates the one or more key segments into the preferred language of the user. With embodiments, the audio input engine 120 translates the entire audio input, rather than the one or more key segments, into the preferred language of the user. With embodiments, the audio input engine 120 may translate the one or more key segments or the audio input into one of many languages.

In block 310, the audio input engine 120, while replaying the audio input, automatically slow down playing the one or more key segments and display closed captioning (as written text on a display screen of the computing device) for the one or more key segments in the preferred language of the user. With embodiments, the audio input engine 120 displays closed captioning for the entire audio input, rather than the one or more key segments, in the preferred language of the user. Also, the audio input engine 120 slows down playing of the one or more key segments to the speed specified in the configuration information.

Embodiments provide improvements for spoken text, using Natural Language Processing (NLP) to process the text and detect key segments and then reducing the speed of those key segments.

Figure 4:
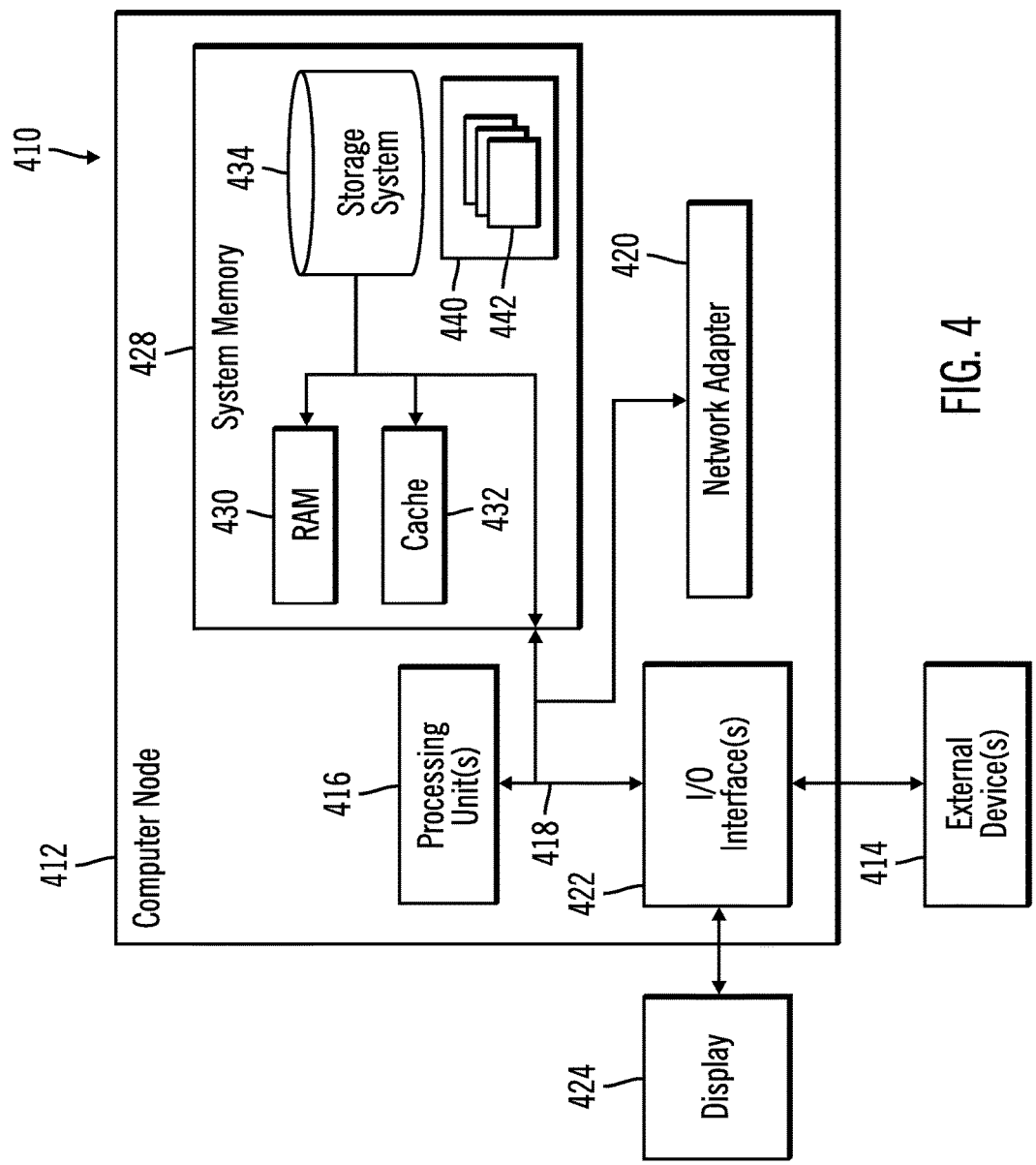
FIG. 4 illustrates a computing node in accordance with certain embodiments.

FIG. 4 illustrates a computing environment 410 in accordance with certain embodiments. In certain embodiments, the computing environment is a cloud computing environment. Referring to FIG. 4, computer node 412 is only one example of a suitable computing node and is not intended to suggest any limitation as to the scope of use or functionality of embodiments of the invention described herein. Regardless, computer node 412 is capable of being implemented and/or performing any of the functionality set forth hereinabove.

The computer node 412 may be a computer system, which is operational with numerous other general purpose or special purpose computing system environments or configurations. Examples of well-known computing systems, environments, and/or configurations that may be suitable for use with computer node 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 412 may be described in the general context of computer system executable instructions, such as program modules, being executed by a computer system. Generally, program modules may include routines, programs, objects, components, logic, data structures, and so on that perform particular tasks or implement particular abstract data types. Computer node 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer node 412 in cloud computing node 410 is shown in the form of a general-purpose computing device. The components of computer node 412 may include, but are not limited to, one or more processors or processing units 416, a system memory 428, and a bus 418 that couples various system components including system memory 428 to one or more processors or processing units 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 412 typically includes a variety of computer system readable media. Such media may be any available media that is accessible by computer node 412, and it includes both volatile and non-volatile media, removable and non-removable media.

System memory 428 can include computer system readable media in the form of volatile memory, such as random access memory (RAM) 430 and/or cache memory 432. Computer node 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, system memory 428 may include at least one program product having a set (e.g., at least one) of program modules that are configured to carry out the functions of embodiments of the invention.

Program/utility 440, having a set (at least one) of program modules 442, may be stored in system memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer node 412 may also communicate with one or more external devices 414 such as a keyboard, a pointing device, a display 424, etc.; one or more devices that enable a user to interact with computer node 412; and/or any devices (e.g., network card, modem, etc.) that enable computer node 412 to communicate with one or more other computing devices. Such communication can occur via Input/Output (I/O) interfaces 422. Still yet, computer node 412 can communicate with one or more networks such as a local area network (LAN), a general wide area network (WAN), and/or a public network (e.g., the Internet) via network adapter 420. As depicted, network adapter 420 communicates with the other components of computer node 412 via bus 418. It should be understood that although not shown, other hardware and/or software components could be used in conjunction with computer node 412. Examples, include, but are not limited to: microcode, device drivers, redundant processing units, external disk drive arrays, RAID systems, tape drives, and data archival storage systems, etc.

In certain embodiments, the computing device 100 has the architecture of computer node 412. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
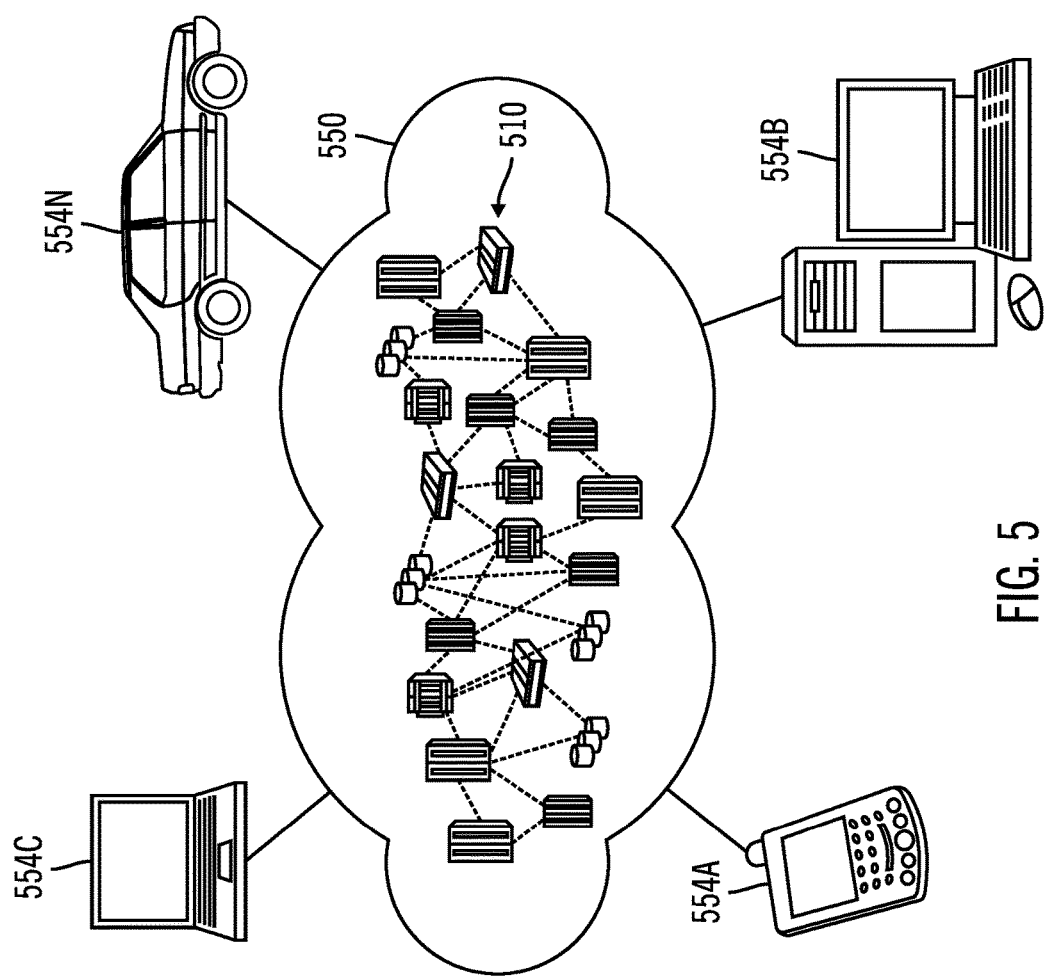
FIG. 5 illustrates a cloud computing environment in accordance with certain embodiments.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
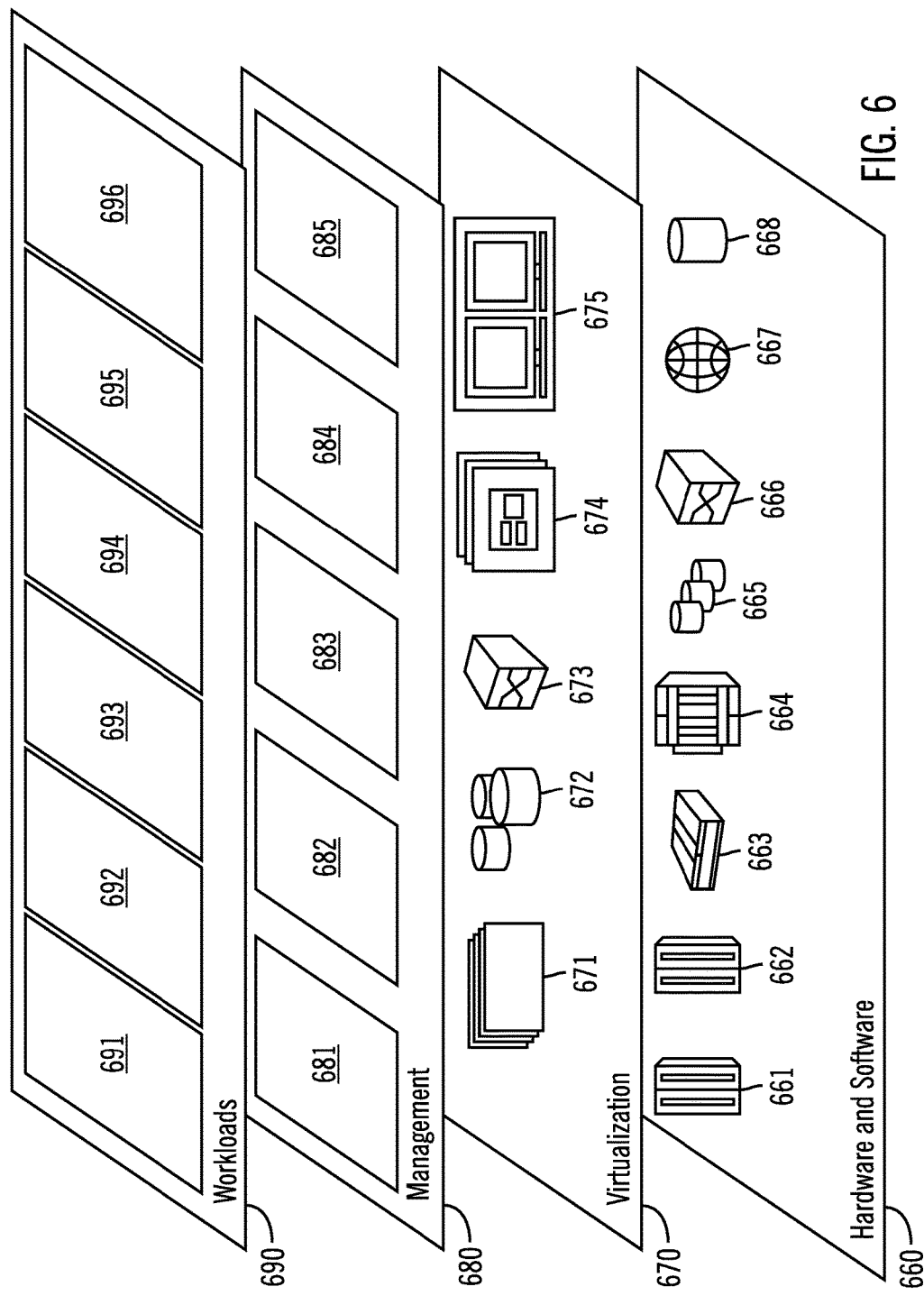
FIG. 6 illustrates abstraction model layers in accordance with certain embodiments.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and message replay enhancement 696.

Thus, in certain embodiments, software or a program, implementing message replay enhancement in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for replay enhancement, comprising:
storing, using a processor of a computer, configuration information that specifies, for each type of audio input of a plurality of audio inputs, a different number of times that the type of audio input is replayed to invoke enhanced replay and a different speed at which the audio input is replayed;
determining, using the processor of the computer, that an audio input of the plurality of audio inputs has been replayed the specified number of times for the audio input to invoke enhanced replay;
in response to the determination,
identifying, using the processor of the computer, a key segment in the audio input; and
identifying, using the processor of the computer, a preferred language of a user listening to the audio input;
in response to determining that a language of the audio input is not the preferred language of the user, translating, using the processor of the computer, the key segment into the preferred language of the user; and
while replaying the audio input,
automatically slowing down, using the processor of the computer, playing of the key segment to the specified speed for the audio input; and
displaying, using the processor of the computer, closed captioning for the key segment in the preferred language of the user.

2. The method of claim 1, wherein the audio input is any of: a voicemail message, audio from a video clip, audio from a screen reader, and an answer played in a Question and Answer (Q&A) system.

3. The method of claim 1, wherein the key segment is identified using configuration information that stores pre-defined key words.

4. The method of claim 1, wherein the audio input is identified as a response to a question asked by the user, and wherein the key segment is identified based on the question.

5. The method of claim 1, wherein the key segment is identified based on portions of the audio input that the user manually replays.

6. The method of claim 1, wherein a Software as a Service (SaaS) is configured to perform method operations.

7. A computer program product for replay enhancement, the computer program product comprising a computer readable storage medium having program code embodied therewith, the program code executable by at least one processor to perform:
storing configuration information that specifies, for each type of audio input of a plurality of audio inputs, a different number of times that the type of audio input is replayed to invoke enhanced replay and a different speed at which the audio input is replayed;
determining that an audio input of the plurality of audio inputs has been replayed the specified number of times for the audio input to invoke enhanced replay;
in response to the determination,
identifying a key segment in the audio input; and
identifying a preferred language of a user listening to the audio input;
in response to determining that a language of the audio input is not the preferred language of the user, translating the key segment into the preferred language of the user; and
while replaying the audio input,
automatically slowing down playing of the key segment to the specified speed for the audio input; and
displaying closed captioning for the key segment in the preferred language of the user.

8. The computer program product of claim 7, wherein the audio input is any of: a voicemail message, audio from a video clip, audio from a screen reader, and an answer played in a Question and Answer (Q&A) system.

9. The computer program product of claim 7, wherein the key segment is identified using configuration information that stores pre-defined key words.

10. The computer program product of claim 7, wherein the audio input is identified as a response to a question asked by the user, and wherein the key segment is identified based on the question.

11. The computer program product of claim 7, wherein the key segment is identified based on portions of the audio input that the user manually replays.

12. The computer program product of claim 7, wherein a Software as a Service (SaaS) is configured to perform computer program product operations.

13. A computer system for replay enhancement, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising:

storing configuration information that specifies, for each type of audio input of a plurality of audio inputs, a different number of times that the type of audio input is replayed to invoke enhanced replay and a different speed at which the audio input is replayed;

determining that an audio input of the plurality of audio inputs has been replayed the specified number of times for the audio input to invoke enhanced replay;

in response to the determination,
   identifying a key segment in the audio input; and
   identifying a preferred language of a user listening to the audio input;

in response to determining that a language of the audio input is not the preferred language of the user, translating the key segment into the preferred language of the user; and while replaying the audio input,
   automatically slowing down playing of the key segment to the specified speed for the audio input; and
   displaying closed captioning for the key segment in the preferred language of the user.

14. The computer system of claim 13, wherein the audio input is any of: a voicemail message, audio from a video clip, audio from a screen reader, and an answer played in a Question and Answer (Q&A) system.

15. The computer system of claim 13, wherein the key segment is identified using configuration information that stores pre-defined key words.

16. The computer system of claim 13, wherein the audio input is identified as a response to a question asked by the user, and wherein the key segment is identified based on the question.

17. The computer system of claim 13, wherein the key segment is identified based on portions of the audio input that the user manually replays.

18. The computer system of claim 13, wherein a Software as a Service (SaaS) is configured to perform computer system operations.

* * * * *